United States Patent
Okuda et al.

(10) Patent No.: US 10,987,898 B2
(45) Date of Patent: Apr. 27, 2021

(54) PEELABLE LAMINATED FILM AND METHOD FOR PRODUCING POLARIZING PLATE

(71) Applicant: FUJIFILM Corporation, Tokyo (JP)

(72) Inventors: Shuhei Okuda, Kanagawa (JP); Daiki Wakizaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 222 days.

(21) Appl. No.: 16/267,846

(22) Filed: Feb. 5, 2019

(65) Prior Publication Data

US 2019/0168482 A1    Jun. 6, 2019

Related U.S. Application Data

(63) Continuation of application No. PCT/JP2017/031486, filed on Aug. 31, 2017.

(30) Foreign Application Priority Data

Sep. 9, 2016   (JP) .............................. JP2016-176541

(51) Int. Cl.
| | | |
|---|---|---|
| *B32B 7/06* | (2019.01) | |
| *B32B 7/02* | (2019.01) | |
| *B32B 27/36* | (2006.01) | |
| *B29D 11/00* | (2006.01) | |
| *B32B 27/00* | (2006.01) | |
| *B32B 27/30* | (2006.01) | |
| *B32B 7/12* | (2006.01) | |
| *G02B 5/30* | (2006.01) | |

(52) U.S. Cl.
CPC .......... *B32B 7/06* (2013.01); *B29D 11/00644* (2013.01); *B32B 7/02* (2013.01); *B32B 7/12* (2013.01); *B32B 27/00* (2013.01); *B32B 27/30* (2013.01); *B32B 27/302* (2013.01); *B32B 27/36* (2013.01); *B29D 11/0073* (2013.01); *B32B 2307/42* (2013.01); *B32B 2307/732* (2013.01); *B32B 2307/748* (2013.01); *G02B 5/3025* (2013.01); *G02B 5/3033* (2013.01)

(58) Field of Classification Search
CPC .......... B32B 7/06; B32B 7/02; B32B 27/302; B32B 27/36
USPC ........................................................ 428/213
See application file for complete search history.

(56) References Cited

U.S. PATENT DOCUMENTS

| | | | | |
|---|---|---|---|---|
| 2004/0253421 | A1* | 12/2004 | Truog ..................... | B32B 5/022 428/195.1 |
| 2005/0249932 | A1 | 11/2005 | Wang et al. | |
| 2005/0249944 | A1 | 11/2005 | Wang et al. | |
| 2007/0141328 | A1* | 6/2007 | Kamiyama .............. | B32B 3/30 428/343 |
| 2008/0032146 | A1 | 2/2008 | Toyoshima et al. | |
| 2015/0253621 | A1 | 9/2015 | Naito et al. | |
| 2016/0109632 | A1 | 4/2016 | Takegami et al. | |
| 2019/0168482 | A1* | 6/2019 | Okuda .................... | B32B 27/00 |

FOREIGN PATENT DOCUMENTS

| | | |
|---|---|---|
| CN | 101099094 A | 1/2008 |
| JP | 2007-536570 A | 12/2007 |
| JP | 2015-011065 A | 1/2015 |
| JP | 2015-169743 A | 9/2015 |
| JP | 2017-156531 A | 9/2017 |
| WO | 2010-110090 A1 | 9/2010 |

OTHER PUBLICATIONS

Notification of Reasons for Refusal which was issued by the Japanese Patent Office dated Sep. 17, 2019, in connection with Japanese Patent Application No. 2016-176541.
Office Action, which was issued by the Korean Intellectual Property Office dated Jun. 19, 2020, in connection with corresponding Korean Patent Application No. 10-2019-7004101.
International Search Report Issued in PCT/JP2017/031486 dated Dec. 5, 2017.
Written Opinion Issued in PCT/JP2017/031486 dated Dec. 5, 2017.
International Preliminary Report on Patentability Issued in PCT/JP2017/031486 dated Mar. 12, 2019.
First Office Action, which was issued by the State Intellectual Property Office dated Apr. 1, 2020, in connection with Chinese Patent Application No. 201780054003.5.

* cited by examiner

*Primary Examiner* — Betelhem Shewareged
(74) *Attorney, Agent, or Firm* — Edwards Neils LLC; Jean C. Edwards, Esq.

(57) ABSTRACT

A peelable laminated film in which a substrate film containing a polyester resin and a light transmitting film containing a resin having a glass transition temperature of higher than 80° C. and an aromatic ester compound are laminated, and a method for producing a polarizing plate which contains bonding a surface of the light transmitting film of the peelable laminated film to a polarizer through an adhesive, the surface being opposite to an interface of the light transmitting film to the substrate film, and then peeling off the substrate film to obtain a polarizing plate having the polarizer and the light transmitting film are provided.

20 Claims, No Drawings

PEELABLE LAMINATED FILM AND METHOD FOR PRODUCING POLARIZING PLATE

CROSS-REFERENCE TO RELATED APPLICATIONS

This is a continuation of International Application No. PCT/JP2017/031486 filed on Aug. 31, 2017, which was published under Article 21(2) in Japanese, and which claims priority under 35 U.S.C. § 119(a) from Japanese Patent Application No. 2016-176541 filed on Sep. 9, 2016. The above applications are hereby expressly incorporated by reference, in their entirety, into the present application.

BACKGROUND OF THE INVENTION

1. Field of the Invention

The present invention relates to a peelable laminated film and a method for producing a polarizing plate.

2. Description of the Related Art

Although an optical film having light transmitting properties (light transmitting film) is used for various applications, a polarizing plate protective film may be mentioned as an example. A polarizing plate protective film is a member for protecting a polarizer in a polarizing plate and light transmitting films formed of various resins are used as a polarizing plate protective film.

As a method for producing a light transmitting film, a method (casting method) in which a solution called a dope is prepared by dissolving a resin in a solvent, and the solution is cast on a metal support is known, and a method for producing a polarizing plate by bonding the obtained light transmitting film and a polarizer is known.

In addition, as a method for producing a polarizing plate having a thinner light transmitting film as a polarizing plate protective film, JP2007-536570A discloses a method for producing a polarizing plate by producing a peelable laminated film by laminating a light transmitting film on a substrate film, then bonding the light transmitting film and a polarizer, and peeling off the substrate film.

SUMMARY OF THE INVENTION

However, since the adhesiveness between a light transmitting film and a substrate film is too weak in a conventional peelable laminated film, in the middle of a polarizing plate working process, partial peeling occurs at the end portion of the polarizing plate or the like and the peeled part is caught in a device. Thus, it is found that there arises a problem that the polarizing plate is broken and cannot pass through a path.

An object of the present invention is to provide a peelable laminated film in which a substrate film and a light transmitting film are laminated, and which has adequate adhesiveness between the substrate film and the light transmitting film, and a method for producing a polarizing plate using the peelable laminated film.

The present inventors have conducted intensive investigations and found the above problems can be solved by the following means.

<1> A peelable laminated film in which a substrate film containing a polyester resin and a light transmitting film containing a resin having a glass transition temperature of higher than 80° C. and an aromatic ester compound are laminated.

<2> The peelable laminated film according to <1>, in which a stress in a case where the substrate film is peeled off from the light transmitting film is 0.05 N/25 mm or more and 2.00 N/25 mm or less.

<3> The peelable laminated film according to <1> or <2>, in which a value obtained by subtracting a solubility parameter value of the light transmitting film from a solubility parameter value of the substrate film is 2 to 5 $(J/cm^3)^{0.5}$.

<4> The peelable laminated film according to any one of <1> to <3>, in which a thickness of the light transmitting film is 0.1 to 10 µm.

<5> The peelable laminated film according to any one of <1> to <4>, in which an in-plane retardation value of the light transmitting film at a wavelength of 590 nm is 0 to 20 nm, and a thickness-direction retardation value of the light transmitting film at a wavelength of 590 nm is −25 to 25 nm.

<6> The peelable laminated film according to any one of <1> to <5>, in which the resin having a glass transition temperature of higher than 80° C. contained in the light transmitting film is a polystyrene-based resin.

<7> The peelable laminated film according to any one of <1> to <6>, in which the aromatic ester compound is a compound obtained by condensing at least one selected from phthalic acid, isophthalic acid, or terephthalic acid, and an aliphatic diol.

<8> The peelable laminated film according to any one of <1> to <7>, in which a weight-average molecular weight of the aromatic ester compound is 500 to 50,000.

<9> A method for producing a polarizing plate comprising:

bonding a surface of the light transmitting film of the peelable laminated film according to any one of <1> to <8> to a polarizer through an adhesive, the surface being opposite to an interface of the light transmitting film to the substrate film, and then peeling off the substrate film to obtain a polarizing plate having the polarizer and the light transmitting film.

According to the present invention, it is possible to provide a peelable laminated film in which a substrate film and a light transmitting film are laminated and which has adequate adhesiveness between the substrate film and the light transmitting film, and a method for producing a polarizing plate using the peelable laminated film.

DESCRIPTION OF THE PREFERRED EMBODIMENTS

Hereinafter, the contents of the present invention will be described in detail. Description on constituent elements described below is made based on representative embodiments of the present invention, but the present invention is not limited to such embodiments. Further, the term "to" used before and after numerical values in the present specification is used to indicate the numerical values as the lower limit and the upper limit.

[Peelable Laminated Film]

A peelable laminated film according to an embodiment of the present invention is a peelable laminated film in which a substrate film containing a polyester resin and a light transmitting film containing a resin having a glass transition temperature that is higher than 80° C. and an aromatic ester compound are laminated.

The peelable laminated film according to an embodiment of the present invention has a structure in which the substrate film and the light transmitting film are laminated, and has adequate adhesiveness between the substrate film and the light transmitting film. Thus, peeling is less likely to occur in the middle of the polarizing plate.

In the peelable laminated film according to an embodiment of the present invention, it is preferable that the substrate film and the light transmitting film are in contact with each other.

The substrate film of the peelable laminated film according to an embodiment of the present invention is peelable from the light transmitting film. The stress in a case where the substrate film is peeled off from the light transmitting film is preferably 0.05 N/25 mm or more and 2.00 N/25 mm or less, more preferably 0.08 N/25 mm or more and 0.50 N/25 mm or less, and even more preferably 0.11 N/25 mm or more and 0.20 N/25 mm or less.

The stress is preferably 0.05 N/25 mm or more since peeling is less likely to occur in the middle of a polarizing plate working process, and the stress is preferably 2.00 N/25 mm or less, since breakage does not occur in the polarizing plate in a case where the substrate film is peeled off.

The stress in a case where the substrate film of the peelable laminated film is peeled off from the light transmitting film is evaluated by after bonding and fixing the surface of the light transmitting film of the peelable laminated film cut into a size of a width of 25 mm and a length of 80 mm to a glass substrate through an acrylic pressure sensitive adhesive sheet, gripping the substrate film at one end (one side having a width of 25 mm) of a test piece in a longitudinal direction using a tensile tester (RTF-1210 manufactured by A&D Co., Ltd.), and subjecting the film to a 90° peel test (in accordance with JIS K 6854-1:1999 "Adhesives-Determination of peel strength of bonded assemblies-Part 1: 90-degree peel") under an atmosphere of a temperature of 23° C. and a relative humidity of 60% at a crosshead speed (grip moving speed) of 200 mm/min.

(Light Transmitting Film)

The light transmitting film of the peelable laminated film according to the embodiment of the present invention will be described.

The total light transmittance of light transmitting film with respect to visible light (at a wavelength of 380 to 780 nm) is preferably 80% or more, more preferably 82% or more, and even more preferably 85% or more.

<Thickness of Light Transmitting Film>

The thickness of the light transmitting film is preferably 0.1 to 10 μm, more preferably 1 to 9 μm, and even more preferably 3 to 6 μm.

<Retardation of Light Transmitting Film>

An in-plane retardation value (Re) of the light transmitting film at a wavelength of 590 nm is preferably 0 to 20 nm, more preferably 0 to 10 nm, and even more preferably 0 to 5 nm.

A thickness-direction retardation value (Rth) of the light transmitting film at a wavelength of 590 nm is preferably −25 to 25 nm, more preferably −20 to 5 nm, and even more preferably −10 to 3 nm.

In addition, it is preferable that Re of the light transmitting film is in the above range and Rth of the light transmitting film is in the above range.

A polarizing plate prepared using the peelable laminated film according to the embodiment of the present invention can be used in liquid crystal display devices of various display methods, and is particularly preferably used in a liquid crystal display device of in plane switching (IPS) mode. In a case where the polarizing plate is used in a liquid crystal display device of in plane switching mode, it is particularly preferable that Re and Rth of the light transmitting film used as a polarizing plate protective film are in the above ranges.

In the present invention, Re and Rth represent in-plane retardation and thickness-direction retardation at a wavelength of 590 nm, respectively.

In the present invention, Re and Rth are values measured at a wavelength of 590 nm in AxoScan OPMF-1 (manufactured by Opto Science, Inc.). Specifically, in a case in which the average refractive index $((Nx+Ny+Nz)/3)$ and the film thickness $(d(\mu m))$ are input to AxoScan, it is possible to calculate Slow Axis Direction (°)

$Re=(Nx-Ny) \times d$ $Rth=((Nx+Ny)/2-Nz) \times d.$

Nx represents the refractive index in the slow axis direction of the film, Ny represents the refractive index in the fast axis direction of the film, and Nz represents the refractive index in the thickness direction of the film.

<Other Characteristics>

Characteristic values of the light transmitting film other than above characteristics are not particularly limited and may have the same performance as a general well-known polarizing plate protective film and it is preferable that the light transmitting film has the performance required for a so-called inner film that is arranged between a polarizer and a liquid crystal cell in a liquid crystal display device. Specific characteristic values may include haze associated with display characteristics, spectral characteristics, moisture-heat resistance of retardation, and the like, and may also include mechanical characteristics, a rate of dimensional change due to heat and humidity thermo associated with polarizing plate working suitability, equilibrium moisture absorptivity, moisture permeability, contact angle, and the like.

<Layer Structure>

The light transmitting film may have a single layer, may have a laminated structure of two or more layers, or may further have a functional layer. However, the light transmitting film preferably satisfies the above characteristics other than the functional layer. The light transmitting film is preferably a single layer.

<Resin>

The resin included in the light transmitting film will be described.

The resin included in the light transmitting film is a resin having a glass transition temperature (Tg) of higher than 80° C. The Tg of the resin is preferably 85° C. or higher and more preferably 90° C. or higher. In a case where the Tg of the resin is higher than 80° C., a light transmitting film having excellent heat resistance is obtained and even in a case where the film is subjected to a heat treatment in a polarizing plate working process, the performance such as polarizing sheet durability is less likely to be deteriorated. In addition, from the viewpoint of solubility in a solvent and working suitability, the Tg of the resin is preferably 250° C. or lower and more preferably 200° C. or lower.

The Tg of the resin can be obtained a temperature of intersection of a base line and a tangential line at an inflection point from a thermogram obtained by conditioning the moisture for 24 hours under an atmosphere of a temperature of 25° C. and a relative humidity of 10%, then sealing a sample in a sample pan, and raising the temperature at 20° C./min using a differential scanning calorimeter "DSC 6200" manufactured by Seiko Instruments Inc.

As long as the resin is a resin having a Tg of higher than 80° C., the resin is not particularly limited. Examples thereof include a polystyrene-based resin, a cellulose-based resin (cellulose acylate resin, cellulose ether resin or the like), a cyclic polyolefin resin, a polyester-based resin, a polycarbonate-based resin, a vinyl-based resin, a polyimide-based resin, and a polyarylate-based resin, and an acrylic resin. A polystyrene-based resin, a cellulose-based resin, a cyclic polyolefin-based resin or an acrylic resin is preferable. Particularly, from the viewpoint of being capable of obtaining excellent durability, and improving the polarizing sheet durability in a case of being used as the polarizing plate protective film, a polystyrene-based resin or cyclic polyolefin resin is preferable and a polystyrene-based resin is more preferable.

The polystyrene-based resin is a resin including 50% by mass or more of a monomer unit derived from a styrene-based monomer. Here, the styrene-based monomer means a monomer having a styrene skeleton in its structure thereof.

The polystyrene-based resin preferably includes 70% by mass or more of a monomer unit derived from a styrene-based monomer and more preferably includes 85% by mass or more of a monomer unit derived from a styrene-based monomer.

As a specific example, the styrene-based monomer may be a homopolymer of styrene or a derivative thereof, or a binary or higher copolymer of styrene or a derivative thereof and another copolymerizable monomer. Here, the styrene derivative is a compound prepared by bonding styrene with another group, and examples thereof include alkylstyrene such as o-methylstyrene, m-methylstyrene, p-methylstyrene, 2,4-dimethylstyrene, o-ethylstyrene, or p-ethylstyrene, and substituted styrene having a hydroxyl group, an alkoxy group, a carboxyl group, or a halogen introduced into the benzene nucleus of styrene, such as hydroxystyrene, tert-butoxystyrene, vinyl benzoic acid, o-chlorostyrene and p-chlorostyrene.

In addition, the polystyrene-based resin includes a copolymer obtained by copolymerizing another monomer component with a styrene-based monomer component. Examples of the copolymerizable monomer include unsaturated carboxylic acid alkyl ester monomers including alkyl methacrylates such as methyl methacrylate, cyclohexyl methacrylate, methylphenyl methacrylate, and isopropyl methacrylate; and alkyl acrylates such as methyl acrylate, ethyl acrylate, butyl acrylate, 2-ethylhexyl acrylate, and cyclohexyl acrylate; unsaturated carboxylic acid monomers such as methacrylic acid, acrylic acid, itaconic acid, maleic acid, fumaric acid, and cinnamic acid; unsaturated dicarboxylic acid anhydride monomers as anhydrides of maleic acid, itaconic acid, ethylmaleic acid, methyl itaconic acid, and chloromaleic acid; unsaturated nitrile monomers such as acrylonitrile, and methacrylonitrile; and conjugated dienes such as 1,3-butadiene, 2-methyl-1,3-butadiene (isoprene), 2,3-dimethyl-1,3-butadiene, 1,3-pentadiene, and 1,3-hexadiene, and two or more of these can be copolymerized.

As the polystyrene-based resin, a plurality of polystyrene-based resins having different compositions, molecular weights, and the like can be used in combination.

The polystyrene-based resin can be obtained by a known anion, bulk, suspension, emulsion or solution polymerization method. In addition, in the polystyrene-based resin, the unsaturated double bond of the benzene ring of the conjugated diene or the polystyrene-based monomer may be hydrogenated. The hydrogenation rate can be measured by a nuclear magnetic resonance apparatus (NMR).

Examples of the cellulose acylate resin include cellulose acetate, cellulose acetate propionate, cellulose propionate, cellulose acetate butyrate, cellulose acetate propionate butyrate, and cellulose acetate benzoate. Among these, cellulose acetate, and cellulose acetate propionate are preferable. The total degree of acyl substitution of the cellulose acylate resin is not particularly limited. For example, a cellulose acylate resin having a total degree of acyl substitution of 1.50 to 3.00 can be used and a cellulose acylate resin having a total degree of acyl substitution of 2.50 to 3.00 is preferable. In a case of using cellulose acetate as the cellulose acylate resin, the degree of acetyl substitution is preferably 2.00 to 3.00, more preferably 2.50 to 3.00, and particularly preferably 2.70 to 2.95. In a case of using cellulose acetate propionate as the cellulose acylate resin, it is preferable that the degree of acetyl substitution is 0.30 to 2.80 and the degree of propionyl substitution is 0.20 to 2.70, it is more preferable that the degree of acetyl substitution is 1.00 to 2.60 and the degree of propionyl substitution is 0.40 to 2.20, and it is particularly preferable that the degree of acetyl substitution is 1.30 to 2.40, and the degree of propionyl substitution is 0.60 to 1.50.

The cyclic polyolefin resin represents a polymer resin having a cyclic olefin structure. As the polymer having a preferable cyclic olefin structure, a cyclic polyolefin resin which is an addition (co)polymer including at least one repeating unit represented by Formula (II), and a cyclic polyolefin resin which is an addition (co)polymer further including at least one or more repeating units represented by Formula (I), if necessary, may be used. In addition, a ring-opened (co)polymer including at least one repeating unit represented by Formula (III) can also be suitably used.

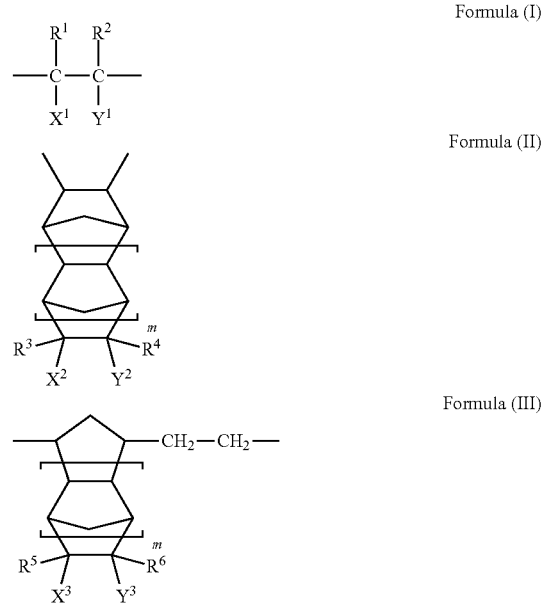

In Formulae (I) to (III), m represents an integer of 0 to 4. $R^1$ to $R^6$ each represent a hydrogen atom or a hydrocarbon group having 1 to 10 carbon atoms, $X^1$ to $X^3$ and $Y^1$ to $Y^3$ each represent a hydrogen atom, a hydrocarbon group having 1 to 10 carbon atoms, a halogen atom, a hydrocarbon group having 1 to 10 carbon atoms substituted with a halogen atom, $-(CH_2)_n COOR^{11}$, $-(CH_2)_n OCOR^{12}$, $-(CH_2)_n NCO$, $-(CH_2)_n NO_2$, $-(CH_2)_n CN$, —$(CH_2)_nCONR^{13}R^{14}$, —$(CH_2)_nNR^{13}R^{14}$, —$(CH_2)_nOZ$, —$(CH_2)_nW$, or $(-CO)_2O$ or $(-CO)_2NR^{15}$ constituted of $X^1$ and $Y^1$, $X^2$ and $Y^2$, or $X^3$ and $Y^3$. $R^{11}$, $R^{12}$, $R^{13}$, $R^{14}$, and $R^{15}$ each represent a hydrogen atom or a hydrocarbon group having 1 to 20 carbon atoms, Z represents a hydrocarbon group or a hydrocarbon group which is substituted with halogen, W represents $SiR^{16}{}_pD_{3-p}$ ($R^{16}$ represents a hydrocarbon group having 1 to 10 carbon atoms, D represents a halogen atom, —$OCOR^{16}$ or —$OR^{16}$, and p represents an integer of 0 to 3), and n represents an integer of 0 to 10.

In addition, a norbornene-based polymer hydride can be preferably used and the norbornene-based polymer hydride is prepared by subjecting a polycyclic unsaturated compound to addition polymerization or metathesis ring-opening polymerization and then to hydrogenation as disclosed in JP2000-240517A (JP-H01-240517A), JP1995-196736A (JP-H07-196736A), JP1985-026024A (JP-S60-026024A), JP1987-019801A (JP-S62-019801A), JP2003-159767A, JP2004-309979A, or the like. In the norbornene-based polymer, $R^5$ to $R^6$ preferably each represent a hydrogen atom or —$CH_3$, $X^3$ and $Y^3$ preferably each represent a hydrogen atom, Cl, or —$COOCH_3$, and other groups may be appropriately selected.

Further, a norbornene-based addition (co)polymer can also be preferably used and norbornene-based addition (co) polymers described in JP1998-007732A (JP-H10-007732A), JP2002-504184A, US2004/229157A1, WO2004/070463A1, or the like may be used. These may be obtained through addition polymerization of norbornene-based polycyclic unsaturated compounds. Further, if necessary, norbornene-based polycyclic unsaturated compounds can be addition-polymerized with conjugated dienes such as ethylene, propylene, butene, butadiene, or isoprene; non-conjugated dienes such as ethylidene norbornene; linear diene compounds such as acrylonitrile, acrylic acid, methacrylic acid, maleic acid anhydride, acrylic acid ester, methacrylic acid ester, maleimide, vinyl acetate, or vinyl chloride.

Examples of the polycarbonate resin include polycarbonate, polycarbonate including a structural unit in which bisphenol A is fluorene-modified, and polycarbonate including a structural unit in which bisphenol A is 1,3-cyclohexylidene-modified.

Examples of the vinyl-based resin include polyethylene, polypropylene, polystyrene, polyvinylidene chloride, and polyvinyl alcohol.

The acrylic resin is preferably has a repeating structural unit derived from an acrylic acid ester monomer or a methacrylic acid ester monomer as a repeating structural unit. Examples of the monomer include acrylic acid esters such as methyl acrylate, ethyl acrylate, n-butyl acrylate, isobutyl acrylate, t-butyl acrylate, cyclohexyl acrylate, and benzyl acrylate; and methacrylic acid esters such as methyl methacrylate, ethyl methacrylate, propyl methacrylate, n-butyl methacrylate, isobutyl methacrylate, t-butyl methacrylate, cyclohexyl methacrylate, and benzyl methacrylate, and these may be used alone or in combination of two or more thereof. Among these, methyl methacrylate is particularly preferable.

The content ratio of the monomer in the monomer component of the acrylic resin to be subjected to a polymerization step of the acrylic resin is preferably 50 to 100% by mass, more preferably 70% to 100% by mass, even more preferably 80% to 100% by mass, and particularly preferably 90% to 100% by mass.

The weight-average molecular weight (Mw) of the resin used for the light transmitting film is not particularly limited but is preferably 3,000 to 1,000,000 and more preferably 10,000 to 500,000.

For the weight-average molecular weight of the resin, the weight-average molecular weight (Mw) and the molecular weight distribution (Mw/Mn) in terms of standard polystyrene were measured under the following conditions. Mn means the number average molecular weight in terms of standard polystyrene.

GPC: gel permeation chromatograph apparatus (HLC-8220GPC, manufactured by Tosoh Corporation, column; guard columns HXL-H, TSK gel G7000HXL, two columns of TSK gel GMHXL, TSK gel G2000HXL, manufactured by Tosoh Corporation, sequentially link together, eluent; tetrahydrofuran, flow rate; 1 mL/min, sample concentration; 0.7% to 0.8% by mass, sample injection amount; 70 μL, measurement temperature; 40° C., detector; differential refractometer (RI) meter (40° C.), standard substance; TSK standard polystyrene manufactured by Tosoh Corporation)

As the resin used for the light transmitting film, one resin or two or more resin may be used. In addition, in a case where the light transmitting film is formed of multiple layers, the resin for each layer may be the same or different from each other.

The content of the resin in the light transmitting film is preferably 50% by mass or more, more preferably 60% by mass or more, and even more preferably 70% by mass or more with respect to the total mass of the light transmitting film. In addition, the content of the resin in the light transmitting film is preferably 99.5% by mass or less with respect to the total mass of the light transmitting film.

<Aromatic Ester Compound>

The aromatic ester compound included in the light transmitting film will be described.

By incorporating the aromatic ester compound in the light transmitting film, it is possible to improve adhesiveness between the light transmitting film and the substrate film including a polyester resin. Although the details of this reason are not clarified, it is considered that since the aromatic ester compound is similar in hydrophilicity and hydrophobicity and the molecular structure to the polyester resin contained in the substrate film, interaction occurs to improve the adhesiveness. In addition, it is considered that the aromatic ester compound is compatible with the resin included in the light transmitting film and can maintain the transparency by bringing the hydrophilicity and hydrophobicity, and the structures close to each other. For example, in a case where the resin included in the light transmitting film is a polystyrene-based resin, it is considered that since the structure of the aromatic ester compound secures compatibility with the polystyrene-based resin from the viewpoint that the ester structure interacts with the polyester resin and has an aromatic ring, and as a result, the adhesiveness between the light transmitting film and the substrate film is improved.

The aromatic ester compound can be obtained by a known method such as dehydration condensation reaction between polybasic acid and polyhydric alcohol or addition and dehydration condensation reaction of dibasic acid anhydride to polyhydric alcohol, and is preferably a polycondensed ester formed by dibasic acid and diol.

The weight-average molecular weight (Mw) of the aromatic ester compound is preferably 500 to 50,000, more preferably 750 to 40000, and even more preferably 2000 to 30000.

The weight-average molecular weight of the aromatic ester compound is preferably 500 or more from the viewpoint of brittleness and moisture-heat resistance, and is preferably 50,000 or less from the viewpoint of compatibility with the resin.

The weight-average molecular weight of the aromatic ester compound can be measured in the same manner as the weight-average molecular weight of the resin included in the light transmitting film.

As the dibasic acid constituting the aromatic ester compound, a dicarboxylic acid can be preferably used.

Examples of the dicarboxylic acid include aliphatic dicarboxylic acids and aromatic dicarboxylic acids, and an aromatic dicarboxylic acid, or a mixture of an aromatic dicarboxylic acid and an aliphatic dicarboxylic acid can be preferably used.

Among the aromatic dicarboxylic acids, an aromatic carboxylic acid having 8 to 20 carbon atoms is preferable, and an aromatic dicarboxylic acid having 8 to 14 carbon atoms is more preferable. Specifically, at least one selected from phthalic acid, isophthalic acid, or terephthalic acid is preferable.

Among the aliphatic dicarboxylic acids, an aliphatic dicarboxylic acid having 3 to 8 carbon atoms is preferable, and an aliphatic dicarboxylic acid having 4 to 6 carbon atoms is more preferable. Specifically, at least one selected from succinic acid, maleic acid, adipic acid, or glutaric acid is preferable and at least one selected from succinic acid or adipic acid is more preferable.

Examples of the diol constituting the aromatic ester compound include aliphatic diols and aromatic diols, and aliphatic diols are particularly preferable.

Among the aliphatic diols, an aliphatic diol having 2 to 4 carbon atoms is preferable and an aliphatic diol having 2 or 3 carbon atoms is more preferable.

Examples of the aliphatic diol include ethylene glycol, diethylene glycol, 1,2-propylene glycol, 1,3-propylene glycol, 1,3-butylene glycol, and 1,4-butylene glycol, and these may be used alone or in combination of two or more thereof.

It is particularly preferable that the aromatic ester compound is a compound obtained by condensing at least one selected from phthalic acid, isophthalic acid, and terephthalic acid or an aliphatic diol.

The terminal of the aromatic ester compound may be sealed by a reaction with a monocarboxylic acid. As the example of the monocarboxylic acid used for sealing, an aliphatic monocarboxylic acid is preferable, acetic acid, propionic acid, butanoic acid, benzoic acid and derivatives thereof are more preferable, acetic acid or propionic acid is even more preferable, and acetic acid is most preferable.

The content of the aromatic ester compound in the light transmitting film is preferably 0.1% by mass or more, more preferably 0.5% by mass or more, and even more preferably 1% by mass or more with respect to the total mass of the light transmitting film. In addition, the content of the aromatic ester compound in the light transmitting film is preferably 25% by mass or less, more preferably 20% by mass or less, and even more preferably 15% by mass or less with respect to the total mass of the light transmitting film. The above range is preferable from the viewpoint of obtaining adequate adhesiveness.

<Other Additives>

Known additives can be mixed in the light transmitting film. Examples of known additives include a low molecular weight plasticizer, an oligomer-based plasticizer, a retardation control agent, a matting agent, an ultraviolet absorber, a deterioration inhibitor, a peeling promoter, an infrared absorber, an antioxidant, a filler, and a compatibilizer. The kind and amount of each material are not particularly limited as long as the effect of the present invention can be obtained. In addition, in a case where the light transmitting film is formed of multiple layers, the kind and amount of the additive of each layer may be different.

(Substrate Film)

The substrate film of the peelable laminated film according to the embodiment of the present invention will be described.

The substrate film of the peelable laminated film according to the embodiment of the present invention is a substrate film including a polyester resin.

The thickness of the substrate film is not particularly limited and is preferably 5 to 100 µm, more preferably 10 to 75 µm, and even more preferably 15 to 55 µm.

The polyester resin included in the substrate film is not particularly limited and known materials can be used. Specific examples thereof include polyethylene terephthalate (PET), polytrimethylene terephthalate (PTT), polybutylene terephthalate (PBT), polyethylene naphthalate (PEN), and polybutylene naphthalate (PBN). Particularly, PET is preferable.

In the peelable laminated film according to the embodiment of the present invention, a value obtained by subtracting a solubility parameter value ($SP_2$) of the light transmitting film from a solubility parameter value ($SP_1$) of the substrate film is preferably 2 to 5 $(J/cm^3)^{0.5}$, and more preferably 3 to 4 $(J/cm^3)^{0.5}$. The above range is preferable from the viewpoint of obtaining adequate adhesiveness.

The solubility parameter values $SP_1$ and $SP_2$ are calculated from the molecular structures of the compounds by the Hoy method described in Polymer Handbook fourth edition. In addition, in a case where a compound is a mixture of a plurality of compounds, the SP value is obtained by multiplying the SP value of each compound by the molar ratio of each compound (however, the sum of the molar ratios of all compounds=1.0).

More specifically, the light transmitting film is cut with a razor, the molecular structure is analyzed by pyrolysis gas chromatograph (GC)/mass spectrometer (MS), and the compositional ratio is analyzed by nuclear magnetic resonance (NMR).

(Method for Producing Peelable Laminated Film)

A method for producing the peelable laminated film according to the embodiment of the present invention will be described.

The peelable laminated film according to the embodiment of the present invention is preferably produced by applying a solution including a resin having a glass transition temperature of higher than 80° C., an aromatic ester compound, and a solvent to the substrate film including a polyester resin and drying the solution to form a light transmitting film. The solvent can be appropriately selected from the viewpoints such that the resin and the aromatic ester compound can be dissolved or dispersed therein; that uniform surface properties are easily obtained in a coating step and a drying step; that liquid preservability can be ensured; and that the solvent has a proper saturated vapor pressure.

(Method for Producing Polarizing Plate)

A method for producing a polarizing plate according to an embodiment of the present invention is a method for producing a polarizing plate including bonding a surface of the light transmitting film of the peelable laminated film according to the embodiment of the present invention, which is opposite to an interface of the light transmitting film to the substrate film, to a polarizer through an adhesive, and then peeling off the substrate film to obtain a having the polarizer and the light transmitting film.

The surface of the light transmitting film of the peelable laminated film opposite to the interface of the light transmitting film to the substrate film may be subjected to a hydrophilic treatment such as a glow discharge treatment, a corona treatment, an alkali saponification treatment or the like, if necessary.

<Polarizer>

The polarizer is not particularly limited and for example, a polarizer obtained by immersing a polyvinyl alcohol film in an iodine solution and stretching the film can be used. That is, as the polarizer, a film including an iodine-polyvinyl alcohol complex can be used.

<Adhesive>

The adhesive is not particularly limited and an aqueous solution of polyvinyl alcohol or polyvinyl acetal (for example, polyvinyl butyral) and a latex of a vinyl-based polymer (for example, polybutyl acrylate), an ultraviolet curable adhesive, or the like can be used. From the viewpoint of suppressing deformation failure of the polarizing plate, it is preferable to use an aqueous solution-based adhesive, and it is most preferable to use an aqueous solution of fully saponified polyvinyl alcohol.

<Peeling of Substrate Film>

The substrate film can be peeled off in the same manner as in a peeling step of a separator (peelable film) which is performed for a normal pressure sensitive adhesive attached polarizing plate. The substrate film may be peeled off immediately after the step of laminating the light transmitting film and the polarizer through the adhesive and drying the laminate, or may be separately peeled off in a subsequent step after the laminate is wound once in a roll shape after a drying step.

<Polarizing Plate>

In the polarizing plate produced by the above method, the light transmitting film may be further bonded to a surface of the polarizer opposite to the surface to which the light transmitting film is bonded, and a conventionally known optical film may be bonded.

(Liquid Crystal Display Device)

The polarizing plate produced by the method for producing the polarizing plate according to the embodiment of the present invention can be used for a liquid crystal display device.

A liquid crystal display device includes a liquid crystal cell and a polarizing plate.

In the liquid crystal display device, the polarizing plate may be arranged in any way, but it is preferable that the light transmitting film in the polarizing plate is arranged to be close to the liquid crystal cell than to the polarizer.

The liquid crystal display device further has a backlight and the polarizing plate is preferably arranged on a backlight side or a viewing side. The backlight is not particularly limited and a known backlight can be used. The liquid crystal display device is preferably formed by laminating the backlight, the backlight side polarizing plate, the liquid crystal cell, and the viewing side polarizing plate in order.

As other configurations, any configuration of a known liquid crystal display device can be adopted. The mode of the liquid crystal cell is not particularly limited, and liquid crystal display devices of various display modes such as a liquid crystal cell of twisted nematic (TN) mode, a liquid crystal cell of in-plane switching (IPS) mode, a liquid crystal cell of ferroelectric liquid crystal (FLC) mode, a liquid crystal cell of anti-ferroelectric liquid crystal (AFLC) mode, a liquid crystal cell of optically compensatory bend (OCB) mode, a liquid crystal cell of supper twisted nematic (STN) mode, a liquid crystal cell of vertically aligned (VA) mode, and a liquid crystal cell of hybrid aligned nematic (HAN) mode crystal cell can be configured. Among these, a liquid crystal cell of an IPS mode is preferable.

For another configuration, any configuration of a known liquid crystal display device can be adopted.

EXAMPLES

The present invention will be described in more detail with reference to the following Examples. The materials, amount of use, ratio, ratio, details of the treatment, procedures of the treatment, and the like shown in the following Examples can be appropriately changed without departing from the spirit of the present invention. Therefore, it is to be understood that the scope of the present invention is not limited to the specific examples shown below.

Example 1

<Preparation of Peelable Laminated Film>

A mixture of a resin, an ester compound, a leveling agent, and a solvent having the following composition was stirred and dissolved in a mixing tank to obtain a resin solution.

The concentration of solid contents of the resin solution was 12.5% by mass.

(Composition of Resin Solution)

| | |
|---|---|
| Resin (PSt) | 97.92 parts by mass |
| Ester compound (Compound A) | 2.00 parts by mass |
| Leveling agent (F-784-F) | 0.08 parts by mass |
| Solvent (ethyl acetate) | 700.00 parts by mass |

The obtained resin solution was filtered through a paper filter having an absolute filtration precision of 10 µm (#63, manufactured by Toyo Roshi Kaisha, Ltd.) and further filtered through a sintered metal filter having an absolute filtration precision of 2.5 µm (FH025, manufactured by Poul) to prepare a resin solution 1.

As a substrate film, LUMIRROR S-105 (polyethylene terephthalate (PET) film having a width of 1,340 mm and a thickness of 40 µm, manufactured by Toray Industries Inc.) was unwound from a roll shape, the resin solution 1 was used and applied by a die coating method using the slot die described in Example 1 of JP2006-122889A under the condition of a conveyance rate of 10 m/min, and the coating film was dried at 110° C. for 60 seconds. Then, a light transmitting film was formed on the substrate film and the film was wound. The amount of the resin solution applied was adjusted such that the film thickness of the light transmitting film became 5 µm and thus a peelable laminated film was obtained.

<Preparation of Polarizing Plate>

1) Film Surface Treatment

The surface of the light transmitting film opposite to the interface of the light transmitting film to the substrate film was subjected to a corona treatment and thus the surface-treated light transmitting film was prepared. In addition, the cellulose acetate film (FUJITAC TD40UC, manufactured by Fujifilm Corporation) was immersed in 1.5 mol/L of an aqueous sodium hydroxide solution (saponification solution) of which the temperature was conditioned to 37° C. for 1 hour and then the film was washed with water. Thereafter, the film was immersed in 0.05 mol/L of an aqueous phosphoric acid solution for 30 seconds and then was further allowed to pass through a washing bath. Then, water was dropped by repeating water removal with an air knife three times, and then the film was allowed to stay in a drying zone at 70° C. for 15 seconds for drying the film. Thus, a saponified cellulose acetate film was prepared.

2) Preparation of Polarizer

According to Example 1 in JP2001-141926A, a different in circumferential speed was given between two pairs of nip rolls and the film was stretched in the longitudinal direction to prepare a polarizer having a thickness of 12 µm.

3) Bonding

Materials of the polarizer thus obtained, the surface-treated light transmitting film, and the saponified cellulose acetate film which had been stored in a rolled state for 3 months were used. The polarizer was sandwiched between the surface-treated light transmitting film and the saponified cellulose acetate film, and then using the following adhesive, the surface-treated light transmitting film and the saponified cellulose acetate film were laminated by a roll-to-roll process such that the absorption axis of the polarizer and the longitudinal direction of the surface-treated light transmitting film and the saponified cellulose acetate film were parallel to each other.

Adhesive: an aqueous solution of 3% by mass of polyvinyl alcohol (PVA-117H manufactured by KURARAY CO., LTD.) was used as an adhesive.

Subsequently, after the film was dried at 70° C., the substrate film was continuously peeled off using the same device as the peeling device of the separator and a pressure sensitive adhesive was further applied to prepare a polarizing plate.

Examples 2 to 13 and Comparative Examples 1 to 3

Peelable laminated films and polarizing plates were prepared by preparing resin solutions in the same manner as in the preparation of the resin solution 1 except that the kind of the resin, and the kind and added amount of the ester compound were changed as shown in Table 2.

The materials used are shown below.

PSt: SGP-10 (manufactured by PS Japan Corporation)
PMMA: DIANAL BR 83 (manufactured by Mitsubishi Rayon Co., Ltd.)
COP: ARTON RX4500 (manufactured by JSR Corporation)
TAC: powder of cellulose acetate having a degree of substitution of 2.86
F-784-F: Leveling agent [MEGAFAC F-784-F, manufactured by DIC Corporation]

Ester compounds A to F, a, and b were synthesized through a condensation reaction of dibasic acids and diols shown in Table 1 at molar ratios shown in Table 1. For those whose "terminal" in Table 1 is described as "Ac", the terminal is sealed with acetic acid. For those whose "terminal" is described as "OH", the terminal is not sealed.

In Table 1, PA represents phthalic acid, IPA represents isophthalic acid, TPA represents terephthalic acid, AA represents adipic acid, SA represents succinic acid, EG represents ethylene glycol, PG represents 1,2-propylene glycol, and 1,3-BG represents 1,3-butylene glycol, respectively. Mw represents weight-average molecular weight.

In Table 2, the glass transition temperature (Tg) of the resin of the light transmitting film, and Re and Rth at a wavelength of 590 nm are shown. In addition, a value ($SP_1$–$SP_2$) obtained by subtracting the solubility parameter value ($SP_2$) of the light transmitting film from the solubility parameter value ($SP_1$) of the substrate film is shown.

(Stress in Case of Peeling Substrate Film from Light Transmitting Film)

The stress in a case of peeling off the substrate film from the light transmitting film was evaluated by after bonding and fixing the surface of the light transmitting film, which is opposite to the interface of the light transmitting film to the substrate film, to a glass substrate through an acrylic pressure sensitive adhesive sheet, gripping the substrate film at one end (one side having a width of 25 mm) of a test piece in a longitudinal direction using a tensile tester (RTF-1210 manufactured by A&D Co., Ltd.), and subjecting the film to a 90° peel test (in accordance with JIS K 6854-1:1999 "Adhesives-Determination of peel strength of bonded assemblies-Part 1: 90-degree peel") under an atmosphere of a temperature of 23° C. and a relative humidity of 60% at a crosshead speed (grip moving speed) of 200 mm/min.

The stress measured was evaluated based on the following standards.

A: 0.11 to 0.20 N/25 mm
B: 0.08 N/25 mm or more and less than 0.11 N/25 mm or more than 0.20 N/25 mm and 0.50 N/25 mm or less
C: 0.05 N/25 mm or more and less than 0.08 N/25 mm or more than 0.50 N/25 mm and 2.00 N/25 mm or less
N: 0.03 N/25 mm or less (Polarizing Sheet Durability)

The polarizing plate was moisture-conditioned under the conditions of a temperature of 85° C. and a relative humidity of 85% for 3 days and then further moisture-conditioned at a temperature of 23° C. and a relative humidity of 60% for 1 day to measure the degree of polarization.

TABLE 1

| | Dibasic acid | | | | | Diol | | | | |
| | Aromatic | | | Aliphatic | | | | | | |
| Ester compound | PA | IPA | TPA | AA | SA | EG | PG | 1,3-BG | Mw | Terminal |
| --- | --- | --- | --- | --- | --- | --- | --- | --- | --- | --- |
| A | 100 | 0 | 0 | 0 | 0 | 100 | 0 | 0 | 2580 | Ac |
| B | 100 | 0 | 0 | 0 | 0 | 100 | 0 | 0 | 750 | Ac |
| C | 100 | 0 | 0 | 0 | 0 | 50 | 0 | 50 | 2580 | Ac |
| D | 100 | 0 | 0 | 0 | 0 | 100 | 0 | 0 | 2560 | OH |
| E | 0 | 50 | 50 | 0 | 0 | 100 | 0 | 0 | 3000 | Ac |
| F | 25 | 50 | 0 | 0 | 25 | 100 | 0 | 0 | 30000 | Ac |
| a | 0 | 0 | 0 | 100 | 0 | 100 | 0 | 0 | 1000 | OH |
| b | 0 | 0 | 0 | 100 | 0 | 50 | 50 | 0 | 1000 | Ac |

TABLE 2

| | Substrate film | Light transmitting film | | | | | | | | Evaluation result | | Polarizing sheet durability |
| --- | --- | --- | --- | --- | --- | --- | --- | --- | --- | --- | --- | --- |
| | | | Ester compound | | | | | | | Stress in case of peeling substrate film from light transmitting film | | |
| | Polyester resin | Resin | Kind | Added amount (% by mass) | Film thickness (μm) | Re (nm) | Rth (nm) | Tg (° C.) | $SP_1-SP_2$ $(J/cm^3)^{0.5}$ | Relative evaluation | Stress (N/25 mm) | Degree of polarization (%) |
| Example 1 | PET | PSt | Compound A | 2 | 5 | 0.4 | −2.7 | 93 | 3.9 | C | 0.05 | 99.93 |
| Example 2 | PET | PSt | Compound A | 8 | 5 | 0.2 | −5.0 | 91 | 3.7 | A | 0.19 | 99.93 |
| Example 3 | PET | PSt | Compound A | 10 | 5 | 0.2 | −4.8 | 90 | 3.6 | B | 0.31 | 99.76 |
| Example 4 | PET | PSt | Compound B | 10 | 5 | 0.2 | −5.0 | 91 | 3.6 | B | 0.08 | 99.9 |
| Example 5 | PET | PSt | Compound B | 13 | 5 | 0.1 | −4.8 | 88 | 3.5 | A | 0.11 | 99.88 |
| Example 6 | PET | PSt | Compound C | 10 | 5 | 0.3 | −4.8 | 91 | 3.6 | C | 0.06 | 99.82 |
| Example 7 | PET | PSt | Compound D | 8 | 5 | 0.2 | −4.7 | 93 | 3.6 | A | 0.11 | 99.78 |
| Example 8 | PET | PSt | Compound E | 10 | 5 | 0.1 | −4.7 | 91 | 3.7 | C | 0.93 | 99.89 |
| Example 9 | PET | PSt | Compound F | 1 | 5 | 0.9 | −3.6 | 93 | 4.0 | A | 0.18 | 99.93 |
| Example 10 | PET | PSt | Compound F | 10 | 5 | 0.2 | −4.6 | 90 | 3.9 | C | 1.34 | 99.90 |
| Example 11 | PET | COP | Compound F | 1 | 5 | 0.6 | −2.8 | 133 | 3.9 | A | 0.14 | 99.93 |
| Example 12 | PET | PMMA | Compound F | 1 | 5 | 0.1 | −1.1 | 101 | 3.8 | B | 0.23 | 99.32 |
| Example 13 | PET | TAC | Compound F | 1 | 5 | 0.5 | −5.9 | 170 | 2.0 | B | 0.50 | 98.90 |
| Comparative Example 1 | PET | PSt | None | 0 | 5 | 0.5 | −2.5 | 95 | 4.0 | N | 0.03 | 99.93 |
| Comparative Example 2 | PET | PSt | Compound a | 10 | 5 | 0.3 | −4.9 | 90 | 3.8 | N | 0.03 | 99.70 |
| Comparative Example 3 | PET | PSt | Compound b | 10 | 5 | 0.2 | −5.0 | 89 | 3.8 | N | 0.03 | 99.76 |

The "added amount of the ester compound" in Table 2 is the added amount (% by mass) of the ester compound with respect to the total mass of the light transmitting film.

From Table 2, in the peelable laminated films of Examples, the adhesiveness the substrate film and the light transmitting film was adequate. The samples of Examples 1 to 11 were particularly excellent in polarizing sheet durability.

According to the present invention, it is possible to provide a peelable laminated film in which a substrate film and a light transmitting film are laminated and which has adequate adhesiveness between the substrate film and the light transmitting film, and a method for producing a polarizing plate using the peelable laminated film.

While the present invention has been described with reference to the detailed or specific embodiments, those skilled in the art will recognize that various changes or modifications can be made without departing from the spirit and scope of the present invention.

The present application is based on Japanese Patent Application filed on Sep. 9, 2016 (JP2016-176541), the content of which is incorporated herein by reference.

What is claimed is:

1. A peelable laminated film in which a substrate film containing a polyester resin and a light transmitting film containing a resin having a glass transition temperature of higher than 80° C. and an aromatic ester compound are laminated.

2. The peelable laminated film according to claim 1, wherein a stress in a case where the substrate film is peeled off from the light transmitting film is 0.05 N/25 mm or more and 2.00 N/25 mm or less.

3. The peelable laminated film according to claim 1, wherein a value obtained by subtracting a solubility parameter value of the light transmitting film from a solubility parameter value of the substrate film is 2 to 5 $(J/cm^3)^{0.5}$.

4. The peelable laminated film according to claim 2, wherein a value obtained by subtracting a solubility parameter value of the light transmitting film from a solubility parameter value of the substrate film is 2 to 5 $(J/cm^3)^{0.5}$.

5. The peelable laminated film according to claim 1, wherein a thickness of the light transmitting film is 0.1 to 10 μm.

6. The peelable laminated film according to claim 2, wherein a thickness of the light transmitting film is 0.1 to 10 μm.

7. The peelable laminated film according to claim 3, wherein a thickness of the light transmitting film is 0.1 to 10 μm.

8. The peelable laminated film according to claim 4, wherein a thickness of the light transmitting film is 0.1 to 10 μm.

9. The peelable laminated film according to claim 1, wherein an in-plane retardation value of the light transmitting film at a wavelength of 590 nm is 0 to 20 nm, and a thickness-direction retardation value of the light transmitting film at a wavelength of 590 nm is −25 to 25 nm.

10. The peelable laminated film according to claim 2, wherein an in-plane retardation value of the light transmitting film at a wavelength of 590 nm is 0 to 20 nm, and a thickness-direction retardation value of the light transmitting film at a wavelength of 590 nm is −25 to 25 nm.

11. The peelable laminated film according to claim 3, wherein an in-plane retardation value of the light transmitting film at a wavelength of 590 nm is 0 to 20 nm, and a thickness-direction retardation value of the light transmitting film at a wavelength of 590 nm is −25 to 25 nm.

12. The peelable laminated film according to claim 1, wherein the resin having a glass transition temperature of higher than 80° C. contained in the light transmitting film is a polystyrene-based resin.

13. The peelable laminated film according to claim 2,
wherein the resin having a glass transition temperature of higher than 80° C. contained in the light transmitting film is a polystyrene-based resin.

14. The peelable laminated film according to claim 3,
wherein the resin having a glass transition temperature of higher than 80° C. contained in the light transmitting film is a polystyrene-based resin.

15. The peelable laminated film according to claim 1,
wherein the aromatic ester compound is a compound obtained by condensing at least one selected from phthalic acid, isophthalic acid, or terephthalic acid and an aliphatic diol.

16. The peelable laminated film according to claim 2,
wherein the aromatic ester compound is a compound obtained by condensing at least one selected from phthalic acid, isophthalic acid, or terephthalic acid and an aliphatic diol.

17. The peelable laminated film according to claim 3,
wherein the aromatic ester compound is a compound obtained by condensing at least one selected from phthalic acid, isophthalic acid, or terephthalic acid and an aliphatic diol.

18. The peelable laminated film according to claim 1,
wherein a weight-average molecular weight of the aromatic ester compound is 500 to 50,000.

19. The peelable laminated film according to claim 2,
wherein a weight-average molecular weight of the aromatic ester compound is 500 to 50,000.

20. A method for producing a polarizing plate comprising:
bonding a surface of the light transmitting film of the peelable laminated film according to claim 1 to a polarizer through an adhesive, the surface being opposite to an interface of the light transmitting film to the substrate film, and then peeling off the substrate film to obtain a polarizing plate having the polarizer and the light transmitting film.

\* \* \* \* \*